United States Patent
McLaughlin et al.

(10) Patent No.: US 7,887,638 B2
(45) Date of Patent: Feb. 15, 2011

(54) REMOVAL OF NIOBIUM SECOND PHASE PARTICLE DEPOSITS FROM PICKLED ZIRCONIUM-NIOBIUM ALLOYS

(75) Inventors: David F. McLaughlin, Oakmont, PA (US); Vanessa R. Youchum, Pittsburgh, PA (US)

(73) Assignee: Westinghouse Electric Co. LLC, Cranberry Township, PA (US)

( * ) Notice: Subject to any disclaimer, the term of this patent is extended or adjusted under 35 U.S.C. 154(b) by 0 days.

(21) Appl. No.: 12/245,085

(22) Filed: Oct. 3, 2008

(65) Prior Publication Data

US 2009/0165596 A1    Jul. 2, 2009

Related U.S. Application Data

(62) Division of application No. 12/029,527, filed on Feb. 12, 2008, now Pat. No. 7,556,696.

(60) Provisional application No. 60/889,997, filed on Feb. 15, 2007.

(51) Int. Cl.
*C23G 1/00* (2006.01)

(52) U.S. Cl. .............. 134/2; 134/26; 134/29; 134/30; 134/36; 134/40; 134/42; 510/254; 510/255; 510/372; 510/375; 510/511; 252/186.28; 252/186.43

(58) Field of Classification Search .............. 134/2, 134/26, 29, 30, 36, 40, 42; 510/254, 255, 510/511, 372, 375; 252/186.28, 186.43
See application file for complete search history.

(56) References Cited

U.S. PATENT DOCUMENTS

| | | | | | |
|---|---|---|---|---|---|
| 2,838,459 | A | * | 6/1958 | Sprout, Jr. | 252/186.29 |
| 3,131,991 | A | * | 5/1964 | Lindner et al. | 252/99 |
| 3,951,594 | A | * | 4/1976 | Smolens | 8/111 |
| 4,731,161 | A | * | 3/1988 | Ehrhardt | 162/78 |
| 5,093,022 | A | * | 3/1992 | Sotoya et al. | 510/376 |
| 5,496,542 | A | * | 3/1996 | Hauschild | 424/53 |
| 5,928,381 | A | * | 7/1999 | Toft et al. | 8/111 |
| 5,929,015 | A | * | 7/1999 | Lagnemo et al. | 510/378 |
| 6,083,892 | A | * | 7/2000 | Severns et al. | 510/220 |
| 2003/0119697 | A1 | * | 6/2003 | Ozaki et al. | 510/302 |
| 2006/0222602 | A1 | * | 10/2006 | Barth et al. | 424/50 |

* cited by examiner

*Primary Examiner*—Sharidan Carrillo

(57) ABSTRACT

The present invention relates generally to a process and chemical composition for the removal of adherent niobium-rich second-phase particles (SPPs) from pickled niobium-containing zirconium alloys which includes applying to the alloy surface a chemical composition comprising alkaline hydrogen peroxide; an alkali metal meta-silicate; and a magnesium salt.

6 Claims, No Drawings

REMOVAL OF NIOBIUM SECOND PHASE PARTICLE DEPOSITS FROM PICKLED ZIRCONIUM-NIOBIUM ALLOYS

CROSS-REFERENCE TO RELATED APPLICATIONS

The present application is a Divisional application of U.S. Ser. No. 12/029,527 filed Feb. 12, 2008, which issued as U.S. Pat. No. 7,556,696 on Jul. 7, 2009, which claims priority of Provisional Patent Application Ser. No. 60/889,997, filed Feb. 15, 2007, incorporated herein by reference.

BACKGROUND OF THE INVENTION

1. Field of the Invention

The present invention relates generally to a process for the removal of niobium-rich second-phase particles (SPPs) from pickled niobium-containing zirconium alloys and a composition for use in such a process.

2. Background Information

Zirconium has many useful properties, among them good physical strength and high corrosion resistance. It is used in the chemical industry based on its ability to withstand many concentrated acids, such as nitric acid and acetic acid. In its hafnium-purified form, zirconium is widely used as a structural material for nuclear fuel cores, taking advantage of its low neutron absorption cross section. Current alloys used in nuclear grade zirconium applications typically contain tin, iron, and sometimes nickel; more recent alloy compositions such as the Westinghouse "Zirlo" alloy also contain percent quantities of niobium for improved corrosion resistance in nuclear reactor environments.

Like most metal product applications, fabrication of nuclear reactor fuel tubes and core components can leave the metal with undesirable surface features on the metal, such as scratches, oxidation stains, and chemical contamination from lubricants. Zirconium components are therefore typically pickled before use, and the parts making up nuclear fuel assemblies may be pickled numerous times during the manufacturing process to control the surface quality and remove contaminants. A typical pickling bath for zirconium can be an aggressive solution containing between 10 and 40% weight nitric acid, plus 1 to 5% hydrofluoric acid.

A specific problem may arise when pickling niobium-containing zirconium alloys. The niobium can segregate within the alloy into very small, second-phase particles (SPPs), typically having binary Zr—Nb or ternary Zr—Nb—Fe compositions. When the niobium-containing zirconium alloy is pickled, dissolution of the Zr matrix can proceed faster than that of the SPPs, so that large quantities of extremely fine, black particles are released into the pickle acid during the pickling process. Unfortunately, when the alloy is removed from the pickle acid, even after thorough rinsing, the surface can be matte black due to a dense coating of adherent particles that do not release from the metal surface during rinsing. This material is known in the industry as "smut," a reference to the similarity of its appearance to black masses of fine fungal spores by the same name.

In general, before any niobium-zirconium alloy can be used in a nuclear reactor application, the "smut" deposits are removed; in part to yield bright, shiny product surfaces and, also to prevent later possible release of such particles into the reactor cooling water and potential deposition within the reactor. On easily accessible exterior surfaces, removal of SPP deposits is not difficult, and can be accomplished by water blasting or mechanical wiping with cloths or sponges. However, many final reactor components contain internal surfaces that are not easily accessible, such as the interior of fuel tubes for both pressurized water reactors (PWRs) and boiling water reactors (BWRs), and the interior of channel boxes in BWRs. Mechanical cleaning of some interior surfaces such as smooth cylindrical tubes may be accomplished by dragging cleaning swabs through the component, but other small channels cannot be cleaned effectively, and small crevices cannot be accessed at all.

A chemical wash, which would either dissolve the SPP deposit or release it from the metal surface, may be considered a solution to this problem. However, dissolution of Zr—Nb and Zr—Nb—Fe second phase particles may not be a likely solution, as any solvent capable of attacking the SPPs may also be capable of attacking the zirconium background even more aggressively, leading to both surface damage, and release of still more SPPs from the alloy. Development of a method and composition to release the "smut" deposit without dissolving it may depend on identification of the nature of how the particles are affixed to the surface.

Thus, an improved process for effectively removing SPPs from niobium-containing zirconium alloys without damaging the material surface is desirable.

SUMMARY OF THE INVENTION

The present invention is directed to a process for removing adherent niobium-rich second-phase-particle (SPP) deposits from a surface of a pickled zirconium niobium alloy, said process comprising applying to the surface of said alloy a composition which comprises alkaline hydrogen peroxide, an alkali metal meta-silicate and a magnesium salt.

The present invention is also directed to a composition for the removal of adherent niobium-rich second-phase particle (SSP) deposits from a surface of a pickled zirconium niobium alloy, said composition comprising hydrogen peroxide, an alkali metal meta-silicate, and a magnesium salt.

DETAILED DESCRIPTION OF THE PREFERRED EMBODIMENTS

The present invention is directed to a process and composition for use in the removal of niobium-rich second-phase particles (SPPs) from the surface of pickled niobium-containing zirconium alloy material. The composition includes alkaline hydrogen peroxide, an alkali metal meta-silicate and a magnesium salt.

Without being bound by any theory, it is believed that as a result of a niobium-containing zirconium alloy being subjected to a pickling process, the freshly pickled zirconium metal is at least partially coated with a thin layer of hydrous zirconia ($ZrO_2 \cdot xH_2O$), a result of electrochemical equilibrium between zirconium metal and low pH water. In the specific case wherein x=2, the hydrous zirconia is stoichiometrically equivalent to zirconium tetrahydroxide, $Zr(OH)_4$. Although this species may not actually exist, it is convenient to refer to it as such herein. This zirconium "hydroxide" layer is very thin; it may be only nanometers in thickness, but is adhesive in nature and may cause the comparably small SPPs to adhere to the alloy surface.

As used herein, the term "SPPs", "SPP deposits" and like terms, refer to a coating of adherent matte black particles that do not readily release from the surface of a zirconium-niobium alloy during rinsing. The terms "smut" and "SPPs" are used interchangeably herein.

The process of the present invention includes the application of a chemical composition to the surface of a pickled niobium-containing zirconium alloy material for the purpose of removing SPPs from the surface of the alloy. As previously described, a zirconium alloy material may be pickled to control the surface quality of the alloy and to remove contaminants. As a result of the pickling process, SPPs are typically released into the pickle solution and adhere to the alloy surface. A rinse step can be employed following the pickling process. However, even following the rinse step, the alloy surface can be coated with adherent SPPs. Thus, the process of the present invention can be employed following the pickling process to remove the adherent SPPs. The chemical composition of the process can be applied to the alloy surface immediately following completion of the pickling and/or rinsing steps or a relatively short time thereafter. Following application of the chemical composition, an optional rinse step can be performed on the alloy surface. No mechanical wiping or physical contact with the alloy surface is needed.

The chemical composition includes alkaline hydrogen peroxide, an alkali metal meta-silicate, and a magnesium salt. The alkaline hydrogen peroxide can be effective in removing the SPPs from the surface of the zirconium alloy material without resulting in damage (e.g., scratching and oxidation staining) to the material surface. The hydrogen peroxide may be present in the chemical composition in an amount of from 3 to 30 weight percent based on the weight of the composition. However, it is generally accepted in the art that a complication of using alkaline hydrogen peroxide is its catalytic decomposition in the presence of transition metals, especially in the form of dissolved ions, and other contaminants. Thus, hydrogen peroxide decomposes at elevated pH and is typically unstable at alkaline pH unless stabilized. The presence of an alkali metal meta-silicate can be useful as a stabilizing agent in the composition. It is believed generally that an alkali metal meta-silicate can deactivate transition metal ions, therefore minimizing or precluding the catalytic decomposition of the alkaline hydrogen peroxide in the composition. The alkali metal meta-silicate may also act as an alkali source to raise the pH to where the hydrogen peroxide is effective, or even most effective, at SPP removal. In general, lower amounts of alkali metal silicate result in greater stabilization of the chemical composition. Suitable examples of alkali metal meta-silicates for use in the chemical composition of the present invention can include but are not limited to sodium meta-silicate, potassium meta-silicate and mixtures thereof. When the alkali metal meta-silicate is added in the form of sodium meta-silicate, $Na_2SiO_3$, can be present in the chemical composition in an amount of from 2 to 12 weight percent based on the weight of the chemical composition.

Typically, the pH of a peroxide solution is controlled to ensure its effectiveness and its chemical stability. In general, the pH of hydrogen peroxide solutions is acidic but typically difficult to predict. The chemical composition of the present invention should have a pH that is sufficiently high because when alkaline sodium meta-silicate is acidified below a certain pH value, the silica is destabilized and the system polymerizes or gels. However, it is also desirable that the pH be sufficiently low because at a high pH the chemical composition may not be as effective, or ineffective, in cleaning the SPPs from the surface of the niobium-containing zirconium alloy. Further, it is desirable that the pH of the chemical composition be such that the composition remains stable when stored.

In one embodiment, wherein hydrogen peroxide is present in the chemical composition in an amount of 10 weight percent and sodium meta-silicate is present in an amount of from 3% to 5.5 weight percent, the pH is in the range of from 10.0 to 10.7.

It is desirable to stabilize the alkaline hydrogen peroxide in order to maintain the pH of the composition within a targeted range. Thus, as previously indicated, alkali metal meta-silicate is added to the chemical composition of the present invention. It is believed that the addition of a magnesium salt to the composition acts to further stabilize the alkaline hydrogen peroxide by trapping transition metals through the in-situ formation of $Mg(OH)_2$. The presence of a magnesium salt in the chemical composition may have at least one of the following benefits: the composition remains in a soft and less cohesive gel form; the composition cleans SPPs from the material effectively; and the magnesium salt does not settle out of solution when the composition is allowed to stand for significant periods of time. Suitable magnesium salts for use in the present invention include but are not limited to magnesium nitrate and magnesium sulfate. Magnesium nitrate is preferred for BWR applications because sulfate poses a risk for intergranular stress corrosion cracking of stainless steel or Inconel components in BWR reactors. Typically, the sulfate levels in BWR cooling water are maintained at less than 10 ppb to preclude intergranular stress corrosion cracking.

The magnesium salt may be present in the chemical composition in an amount of at least 0.04, or from 0.20 to 1.0 weight percent based on the weight of the chemical composition. In one embodiment, magnesium sulfate, $MgSO_4$, is present in an amount of 1.0 weight percent based on the weight of the chemical composition. The presence of the magnesium salt in the chemical composition provides for effective cleaning of the surface of the niobium-containing zirconium alloy and allows the solution to remain effective for extended periods of time, such as at least 500 hours.

The process of the present invention includes applying the chemical composition to the surface of a pickled and optionally rinsed niobium containing zirconium alloy using any conventional techniques known in the art for applying a gel or solution to an alloy surface. Such techniques include but are not limited to pouring, wiping, brushing, rolling, dipping, sponging and the like. In embodiments wherein the chemical composition is applied to the alloy surface by pouring, dipping or the like, the application of the chemical composition is effective at cleaning complex metal forms where access to interior surfaces with a brush, cloth or other mechanical implement is inconvenient or impossible. In one embodiment, the zirconium alloy having SPPs adhered to its surface is dipped into a bath containing the chemical composition of the present invention. The chemical composition can be applied to a wide range of niobium-containing zirconium alloy materials including but not limited to those materials typically used in the manufacture of components for a nuclear reactor. The process of the present invention also includes an optional rinse step subsequent to applying the chemical composition, wherein the material surface can be contacted with water, such as deionized water.

The process of the present invention is typically carried out at ambient temperature. While elevated temperatures may accelerate the process of SPP removal, such elevated temperatures may increase the potential risk of damage to the alloy surface.

When the alloy surface is subjected to the chemical process of the present invention, it is believed that the SPPs dissolve in the chemical composition, because a dark color that is left behind in the composition immediately after cleaning disappears after a period of time and the composition returns to its initial white color.

The present invention is more particularly described in the following non-limiting example which is intended to be illustrative only, as numerous modifications and variations therein will be apparent to those skilled in the art.

As used herein, the phrase "Zirlo coupon" refers to a post-age-stamp-sized sample of sheet metal alloy composition (from Westinghouse Electric Co. LLC, Pittsburgh, Pa.) used for test studies, in which the composition contains tin, iron and approximately one percent niobium.

In order to develop a chemical composition capable of releasing SPPs from a zirconium-niobium alloy component without dissolving the SPPs (and thus dissolving the zirconium background as well), it was necessary to identify the nature of how SPPs affix to the surface of a zirconium-niobium alloy. To this end, preliminary studies were performed at the Westinghouse Electric Co. LLC Science and Technology Department (Pittsburgh, Pa.). These studies revealed that freshly pickled zirconium metal was coated with a very thin layer of hydrous zirconia ($ZrO_2 \cdot xH_2O$), believed to be a result of electrochemical equilibrium between zirconium metal and low pH water. In the specific case where x=2, the hydrous zirconium was stoichiometrically equivalent to zirconium tetrahydroxide: $Zr(OH)_4$. Although $Zr(OH)_4$ actually may not exist, it was convenient to refer to it as such. This layer of zirconium "hydroxide" was very thin, i.e., nanometers in thickness, but was adhesive and appeared to behave as a "glue," which caused comparably small SPPs to adhere to the metal surface of the zirconium-niobium alloy.

Based on these findings, studies were conducted to determine the optimal washing solution capable of removing the zirconium "hydroxide" "glue" from the surface of zirconium-niobium alloys. Zirconium "hydroxide" has an extremely low solubility in water and was considered in the art to be soluble only in a few substances, such as very concentrated sodium and/or potassium hydroxide, alkaline hydrogen peroxide, concentrated hydrofluoric, sulfuric and oxalic acids, and possibly ammonium carbonate (Blumenthal, W.B., *The Chemical Behavior of Zirconium*, D. van Nostrand Co. Inc., Princeton, N.J., 1958, pp. 191-193).

EXAMPLE

Alkaline peroxide was first tested using sodium hydroxide (NaOH) for alkalinity. From the first screening test, it was apparent that elevated pH accelerated peroxide decomposition, resulting in vigorous gas release and foaming of the solution. Titration life tests were done using a standard analytical titration procedure for hydrogen peroxide ($H_2O_2$), to determine how quickly ($H_2O_2$) decomposed under those conditions. Each solution tested contained 10% $H_2O_2$, with varying amounts of NaOH, and the remainder being water. It was found that 0.5%, 1%, and 10% NaOH all decomposed quickly. The 0.5% NaOH and 1% NaOH solutions resulted in a violent reaction when initially mixed with the $H_2O_2$, and nearly 50% of the $H_2O_2$ decomposed in only a few hours. The 10% NaOH solution decomposed a little more slowly but, in only approximately 50 hours, 50% of the hydrogen peroxide had decomposed.

These solutions were tested for their effectiveness in removing smut from Zirlo pickled in $HNO_3$/HF pickle acid followed by a DI rinse. The pickled Zirlo coupons were dipped in the alkaline peroxide solutions with only gentle agitation, but no mechanical contact or wiping. They were somewhat effective at cleaning the smut; black smut was visably released when the Zirlo coupons were immersed. However, a dull, smoky finish was left behind on the Zirlo coupons. Because of the less than acceptable smut removal results and the solution instability, other stabilized alkaline peroxide mixtures were sought and tested.

Hydrogen Peroxide and $Na_2SiO_3$

Sodium meta-silicate ($Na_2SiO_3$) was tested as a stabilizing agent for use with hydrogen peroxide. As initially prepared, all solutions discussed herein contained 10% by weight of hydrogen peroxide with varying amounts of sodium meta-silicate and the remainder being water.

Gel Formation and pH for Smut Removal

A variety of silicate solutions containing from 2% $Na_2SiO_3$ to 7% $Na_2SiO_3$, with increasing increments of 0.5%, were made to determine a pH range for smut removal. It was observed that the initially clear solutions containing 3%-5.5% sodium meta-silicate had formed silica gels when allowed to stand over night. The texture of the gel was soft, and the solution remained fluid and easily pumpable. The pH range of these gels was from 10.1 to 10.7 and the gels were effective in smut removal when the Zirlo coupons were dropped therein.

Peroxide Stabilization by $Na_2SiO_3$

Peroxide life tests were performed on the solutions having $Na_2SiO_3$ concentrations of 3.0%, 3.5%, 4.0%, 4.5% and 5% by wt. Also tested was a solution containing 10% $H_2O_2$ and 10% NaOH. While the 10% sodium hydroxide solution had decomposed by 90% in 175 hours, the 3% sodium meta-silicate solution decomposed by only 50% in the same amount of time.

The stability of the peroxide, however, was still not as good as would be desired for a commercial process and, as the acidic hydrogen peroxide decomposed, the pH increased and eventually had risen beyond the maximum value of the silica gel range (10.1<pH<10.7), and was no longer effective at cleaning smut from the Zirlo coupons.

pH Stability of $Na_2SiO_3$—$H_2O_2$ Solutions

Additional life tests were performed on 2.0%, 2.5%, and 3.0% $Na_2SiO_3$ solutions. Both pH and $H_2O_2$ composition were recorded with respect to time. Smut removal was also observed over a period of time to determine an effective pH range and $H_2O_2$ composition range. The 3% $Na_2SiO_3$ solution was initially just below the minimum value of the silica gel pH range, and cleaned the Zirlo coupons well. After standing overnight, the solution reached a pH of 10.15 and became gelatinous. After standing for 92 hours, the pH had reached 10.69 and was still effective at cleaning the Zirlo coupons. However, beyond 92 hours, the solution became ineffective at cleaning and was no longer gelatinous.

The 2.5% $Na_2SiO_3$ solution had a pH of 9.90 initially and did not become effective at cleaning the smut until 68 hours had passed. The pH had risen to 10.31, and the solution had became slightly gelatinous. After 184 hours, it had reached a pH of 10.82, was no longer gelatinous, and also was no longer effective at cleaning the smut.

The 2% $Na_2SiO_3$ solution began at a pH of 9.80 and was not effective to clean the smut until after it was allowed to stand for 164 hours. The pH was 10.23 and the solution had become slightly gelatinous. This solution became ineffective at cleaning the smut after 336 hours had passed, and a pH of 10.69 was reached. At this time, the solution was no longer gelatinous.

The peroxide-meta-silicate solutions containing 3% sodium meta-silicate were used as the basis for further stabilization tests.

Stabilization of $H_2O_2$—$Na_2SiO_3$ Solutions with Magnesium Sulfate

To further stabilize the hydrogen peroxide/sodium meta-silicate solutions, magnesium sulfate was added. It was postulated in the art that the addition of magnesium sulfate to an alkaline solution, causes $Mg(OH)_2$ precipitates to form which co-precipitate catalytic heavy or transition metal ions such as $Ni^{2+}$ and $Mn^{2+}$.

Peroxide and pH Stability of $Na_2SiO_3$—H Solutions with 0.5% $MgSO_4$

A solution that contained only 10% $H_2O_2$ and 3% $Na_2SiO_3$ was compared with the same solution that also contained 0.5% $MgSO_4$. Initially, only 0.5% $MgSO_4$ was tested. A white colloidal precipitate formed immediately when the magnesium sulfate was added, and a gel formed within 24 hours of aging. Once the initially stiff gel was mixed, it broke down into a gel which was softer and less cohesive than the gels formed in the absence of magnesium sulfate. The gelled magnesium sulfate solution initially had a pH of 10.0.

The 0.5% magnesium sulfate was very effective at stabilizing the hydrogen peroxide. After being allowed to stand for 175 hours (~1 week), 76% of the original $H_2O_2$ concentration was still present in the solution, and the pH had only increased from 10.0 to 10.2. The aged solution was also highly effective at cleaning smut from the Zirlo coupons when the coupons had been dipped in the solution at ambient temperature. Additional solutions were therefore tested at longer aging times having varying amounts of $MgSO_4$ in the range of from 0.2% to 1%, with increasing increments of 0.2%, based on the total weight of the solution.

$MgSO_4$ Concentration Required for Stabilization

Life tests were performed on these solutions. In all cases, the solutions were initially agitated for ten minutes with a magnetic stirrer to avoid the initial stiff gel formation upon addition of the $MgSO_4$. With no magnesium, the $H_2O_2$ rapidly decomposed, with corresponding elevation of the pH. In general, as the magnesium concentration increased, the rate of $H_2O_2$ decomposition decreased. For the 1% $MgSO_4$ solution, 75% of the peroxide was still present after 500 hours and the pH had increased by only 0.2 units.

The physical properties of the solutions varied considerably during aging, depending on the amount of magnesium sulfate added. For 0.2% and 0.4% $MgSO_4$ solutions, neither solution was effective at smut removal initially. However, both formed a gel after one day had passed, and were very effective at smut removal once the gel had formed. The solutions containing 0.6%, 0.8%, and 1% $MgSO_4$ did not form a gel, only the initial white colloidal precipitate. These latter solutions were immediately effective at cleaning the smut, even in the absence of silica gel, and remained so for the duration of the test.

Good initial and long-term smut removal without gel formation was achieved with 0.5% $MgSO_4$. All concentrations from 0.2% to 1.0% produced approximately equivalent smut removal even after being allowed to stand for up to 500 hours.

Settling Rate of Magnesium Precipitates from $MgSO_4$ Solutions

A potential concern with the use of magnesium sulfate at concentrations above 0.4% was that a white precipitate settled out slightly as the solution was allowed to stand. Studies were therefore done to determine the settling rate of solutions containing a range of magnesium sulfate concentrations. For these tests the solutions were agitated until visibly homogenous. The solutions were then poured into a graduated cylinder and the volume of the precipitate was recorded with time.

The initial settling behavior of freshly mixed solutions of 10% $H_2O_2$, 3% $Na_2SiO_3$, and variable amounts of $MgSO_4$ was observed. With low magnesium levels, the precipitate settled rapidly. For example, within 10 minutes, the 0.2% $MgSO_4$ sample precipitate had settled to 20% the initial sample volume. For $MgSO_4$ concentrations of 0.8% and greater, although the quantity of $Mg(OH)_2$ formed was greater, settling was very slow, suggesting that although a visible gel had not formed, solution-phase polymerization had occurred, and the colloid was stable. These higher concentrations also performed well initially at smut removal when Zirlo coupons were dipped in the solutions.

The low-concentration magnesium solutions behaved significantly different after aging for 24 hours. The results for 0.8%, and 1.0% $MgSO_4$ were essentially unchanged. However, after 24 hours, the solutions containing 0.2% and 0.4% $MgSO_4$ had gelled. The solutions were agitated again, and initially exhibited a small amount of settling (about 5%). However, after ten minutes, they had both expanded again, and formed a stable gel completely filling the container. Changes had also occurred in the 0.6% sample, which showed only 7% settling at 1000 seconds as compared to 40% when it was freshly prepared.

With longer-term aging (168 hours), the results changed for the lower-magnesium samples. The 0.2% and 0.4% no longer showed the expansion, but settled by 25-30% at 1000 seconds; the 0.6% $MgSO_4$ sample compacted by 25% at 1000 seconds. The 0.8% and 1.0% samples were essentially unchanged; there was very slow settling, no greater than 10% at about 20 minutes.

The evolution of the solution-phase colloids appeared to be a process that was not necessarily visible to the naked eye. Although the 0.8% and 1.0% $MgSO_4$ samples did not appear to form a gel, the settling behavior seems to indicate that polymerization may have taken place, supported by their long-term efficiency at removing smut.

$M(NO_3)_2$ Stabilization: Gelation and Settling

Two solutions of 10% $H_2O_2$ and 3% $Na_2SiO_3$ were prepared; the remainder being water. To one was added 1.0% wt $MgSO_4$ and, to the other was added 1.2% wt $Mg(NO_3)_2$ (both containing 0.20% wt $Mg^{2+}$). These solutions were evaluated in five categories: smut removal, $H_2O_2$ decomposition, pH stability, settling rate, and gelation behavior. The results are summarized below.

When each of the solutions were first mixed they both created a thick gel, and then formed a thin gel after mild agitation. The solutions were allowed to stand overnight, both of the solutions looked similar; the gels settled, and there was a clear solution on top (~20% vol), with a white suspension on the bottom. After mixing, the solutions were a thin gel. After 3 days, both of the solutions became thinner, and they no longer appeared to be gels, but rather thick, milky solutions. Both of the solutions maintained this consistency for the remainder of the tests, and the precipitates in each did not settle to less than 70% vol.

$Mg(NO_3)_2$ Stabilization: pH Stability

For a period of more than 450 hours, the pH of both solutions (nitrate and sulfate) did not vary by more than 0.2 pH points from the initial pH.

$Mg(NO_3)_2$ Stabilization: Smut Removal Capability

The two solutions performed essentially the same in coupon washing tests. The tests were all done in the same manner for the same amount of time. Each Zirlo coupon was dipped in a pickle bath ($HNO_3$/HF) for two minutes; rinsed with DI water for 2 minutes; dipped in the peroxide solution for 2 minutes; and then rinsed with DI water again for 2 minutes. The Zirlo coupons came out of the bath clean and shiny for all tests except for the last test that was conducted. It was believed that such result was probably due to a lower amount of $H_2O_2$ being present as a result of decomposition. The Zirlo coupons from the last test were placed back into the bath for another 15 seconds, and after the additional 15 seconds, they too were clean and shiny.

$Mg(NO_3)_2$ Stabilization: $H_2O_2$ Stability

The two solutions demonstrated substantially the same performance with regard to stability when allowed to stand for a time period of up to 260 hours. At 420 hours, the Mg(NO$_3$)$_2$ exhibited greater peroxide retention by 1.5 wt %. Thus, the results indicate that Mg(NO$_3$)$_2$ is at least as good of a peroxide stabilizer as MgSO$_4$.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to given the full breadth of the claims appended and any and all equivalents thereof.

What is claimed is:

1. A smut removal composition, consisting of:
    3 to 30 weight percent of hydrogen peroxide based on a total weight of the composition;
    2 to 12 weight percent of an alkali metal meta-silicate based on a total weight of the composition;
    0.2 to 1.0 weight percent of a magnesium salt based on a total weight of the composition;
    a remainder weight percent of water based on a total weight of the composition; and
    a pH value in the range of from 10.0 to 10.7.

2. The smut removal composition of claim 1 wherein the alkali metal meta-silicate is selected from the group consisting of sodium meta-silicate and potassium meta-silicate.

3. The smut removal composition of claim 1 wherein the magnesium salt is selected from a group consisting of magnesium sulfate and magnesium nitrate.

4. The smut removal composition of claim 1 wherein the smut removal composition is in a form of a gel.

5. The smut removal composition of claim 2 wherein the alkali metal meta-silicate is sodium meta-silicate.

6. The smut removal composition of claim 3 wherein the magnesium salt is magnesium sulfate.

* * * * *